United States Patent [19]
Dahlberg

[11] Patent Number: 5,664,169
[45] Date of Patent: Sep. 2, 1997

[54] MICROPROGRAMMABLE PROCESSOR CAPABLE OF ACCESSING UNUSED PORTIONS OF CONTROL STORE AS FAST DATA MEMORY

[75] Inventor: Bjorn M. Dahlberg, Irvine, Calif.

[73] Assignee: Hilevel Technology, Inc., Tustin, Calif.

[21] Appl. No.: 680,445

[22] Filed: Jul. 15, 1996

Related U.S. Application Data

[63] Continuation of Ser. No. 118,419, Sep. 8, 1993, Pat. No. 5,537,627.

[51] Int. Cl.⁶ ..................................................... G06F 9/30
[52] U.S. Cl. ..................................................... 395/598
[58] Field of Search ...................................... 395/598, 800

[56] References Cited

U.S. PATENT DOCUMENTS

| | | |
|---|---|---|
| 4,171,536 | 10/1979 | Heuer et al. . |
| 4,204,252 | 5/1980 | Hitz et al. . |
| 4,521,858 | 6/1985 | Kraemer et al. . |
| 4,651,275 | 3/1987 | McDonough . |
| 4,858,109 | 8/1989 | Webber . |
| 5,034,887 | 7/1991 | Yasui et al. . |
| 5,410,665 | 4/1995 | Molnar . |

OTHER PUBLICATIONS

Fredrick J. Hill et al., *Microprogramming, Digital Systems: Hardware Organization and Design*, 1973, pp. 228–269.
Andrew S. Tanenbaum, *The Microprogramming Level, Structured Computer Organization*, 1976, pp. 141–214.

*Primary Examiner*—William M. Treat
*Attorney, Agent, or Firm*—Knobbe, Martens, Olson & Bear, LLP

[57] ABSTRACT

A microprogrammable processor is capable of accessing unused portions of a control store as fast data memory. The microprogrammable processor includes a microsequencer that accesses microinstructions from either an internal control store or an external control store. These microinstructions control the operation of the microprogrammable processor. When the microsequencer accesses instructions from an internal control store, the microprogrammable processor is operable to access external control store as fast data memory.

8 Claims, 6 Drawing Sheets

MICROPROGRAMMABLE PROCESSOR CAPABLE OF ACCESSING UNUSED PORTIONS OF CONTROL STORE AS FAST DATA MEMORY

This application is a continuation of U.S. patent application Ser. No. 08/118,419, filed Sep. 8, 1993, now U.S. Pat. No. 5,537,627.

FIELD OF THE INVENTION

The present invention generally relates to microprogrammable processor architectures and, more particularly, is concerned with a microprogrammable processor utilizing a dual bus architecture to provide access into a microprogram control store, both to retrieve microinstructions and to store and retrieve data.

BACKGROUND OF THE INVENTION

Since the early 1940's, digital computers have implemented the control functions of the computer in a variety of manners. On early machines, the instructions for arithmetic, Boolean operations, shifting, comparing, and looping were directly executed by hardware. Specific circuits existed for each instruction. As technology developed, it became difficult to isolate the circuits for each instruction. Different techniques were used to implement the control functions of such a computer. One such technique that provided a systematic and orderly approach to designing the control section of any computing system or processor was microprogramming.

Microprogramming is a technique used by designers to implement the control functions of a computer or processor by developing a set of microinstructions that map directly into hardware impulses. The concept of generating hardware impulses directly from computer instructions was originally conceived by M. V. Wilkes in 1951. Microprogrammable processors store "microprograms" (a set of microinstructions) in a memory, usually referred to as a "control store." Each microinstruction in a typical microprogrammable machine maps directly into hardware impulses that control the operation of the computer or processor.

Microprogramming has several advantages over conventional machines that hardwire control functions. First, the user can tailor the system containing the microprogrammable processor to the specific needs of his application. In addition, microprogrammable computers are easier to design and are conceptually simpler than hardwired computers.

Early microprogrammable systems used read-only memory ("ROM") to store the control microinstructions of the computer system. The next generation of microprogramming systems evolved around 1970 with the advent of fast PROMs (programmable read only memories). Later that decade, RAMs (random access read/write memory) were introduced which added flexibility and, in the long run, reduced cost. With the use of RAM that can be written to, it became unnecessary for a control store to contain all interpretations for each and every instruction for that machine. Rather, routines could be overlaid by loading different microprograms into control store.

A typical application for a microprogrammable processor or computer is to execute interpreters for other virtual machines. When operating as an interpreter, also known as an "emulator", the microprogrammable processor "emulates" other virtual machines. The level in which programs are being executed interpretively is called the target level. The level at which the interpreter (or microprogram) runs is called the host level. The host and target levels are always different levels of the same computer. The control store that stores the microprogram which provides control of a typical microprogrammable processor is physically distinct from the memory used by the target machines to store program and data. By using RAM for microprogram storage, a number of different target level machines may be emulated on the same host level machine. The microprogramming level, or host level, provides the basic microinstruction operations from which target machine instructions can be built. Typically, a user of a microprogrammable processor writes programs at the target level using a machine or assembly language, which in some cases may be more convenient and easier to use than microprogramming.

Since the early 1950's, two predominant computer architectures have existed for target level machines—the Harvard machine and the von Neumann architecture (also known as the "Princeton" architecture). The two architectures differ radically in one sense: the Harvard architecture separates memory into program memory and data memory, while the von Neumann architecture uses the same memory for both instructions and data. The Harvard architecture is very powerful since severe bottlenecks can be avoided by having separate data and instruction memories. However, the von Neumann architecture has the advantage of lower cost because only one memory array is required. Underlying both of these architectures in many machines is the concept of execution of instructions retrieved from a microprogrammable control store. Target level instructions are retrieved and executed from main memory by the execution of microprograms stored in a control store. Furthermore, underlying many von Neumann target level machines is an internal Harvard architecture at the host level. In these machines, a separate memory is required for the microprogram microinstructions and the microprogram data.

Recent advances in RAM technology in terms of speed, density, and price have made it even more advantageous to use RAM versus ROM for control store implementation. However, since microprogramming implies that the target memory and host memory are separate, any RAM space not used for storage of microprogram instructions may not be used for any other function. The potential exists that an enormous waste of memory resources may occur in a microprogrammable system.

Therefore, applicant has perceived a need for a microprogrammable processor that takes advantage of extra control store resources as fast external data memory. More specifically, applicant has seen a need for a processor that reconciles the concept of a von Neumann-type host machine that has the ability to share control store as fast data memory and an internal Harvard bus architecture that allows simultaneous access to microinstructions and data stored in the same memory.

SUMMARY OF THE INVENTION

In accordance with the present invention, a microprogrammable processor capable of accessing unused portions of a control store as fast data memory is provided. The present invention substantially eliminates or reduces disadvantages and problems associated with prior microprogrammable processors. The microprogrammable processor of the present invention includes a microsequencer that controls program flow and accesses microinstructions from either an internal control store or an external control store. When the microsequencer accesses instructions from an internal control store, the microprogrammable processor may access external control store as fast data memory. As used herein, "internal" means internal to a VLSI (very large scale integrated circuit) such as a gate array or an ASIC (application specific integrated circuit), and "external" is outside such a circuit.

According to one embodiment of the invention, access to the external control store as fast data memory is provided by two internal communication buses. The first communication bus provides electrical communication between the microsequencer and the internal control store. The second internal communication bus permits the microsequencer to access an external control store. Both buses may be used to read microinstructions from their respective control store. However, when the first internal communication bus is accessing instructions from an internal control store, the second internal communication bus permits the programmable processor to access the external control store as fast data memory. A multiplexer is provided to select the operation of the second internal communication bus. A detection circuit detects accesses by the microsequencer to the internal control store and configures the multiplexer to allow the second internal communication bus to access the external control store as fast data memory.

According to another embodiment of the invention, a memory address unit accesses the external control store when the microsequencer is accessing microinstructions from the internal control store. Data in the external control store is addressed logically starting from address 0. The logical data address is translated into a physical data address by an adder that adds the contents of a user programmable memory boundary address register to the logical data address. The memory boundary address register contains a value indicating the physical boundary between the space configured for storage of microprograms and the space configured for storage of data.

According to another aspect of the present invention, a method for managing the control store of a microprogrammable processor is provided. An internal control store and an external control store contain microinstructions that control operation of the microprogrammable processor. The method includes the steps of configuring portions of the external control store as data memory and generating data accesses to that external control store when the microprogrammable processor accesses microinstructions from the internal control store.

An important technical advantage of the present invention inheres in its ability to allow a microprogrammable processor to access unused portions of a control store as fast data memory. The use of a dual internal address bus architecture permits simultaneous access of microinstructions and data. Furthermore, microprograms and data may share the same memory resources. This configuration provides the benefit of reduced external memory costs.

Another important technical advantage of the present invention is the ability to address data in the external control store at a physical data address starting at a value corresponding to the contents of a memory boundary address register by providing a logical data address starting at address zero.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF THE PREFERRED EMBODIMENT

The preferred embodiments of the present invention are illustrated in FIGS. 1–7 of the drawings, like numerals being used to refer to like and corresponding parts of the various drawings.

Figure 1:
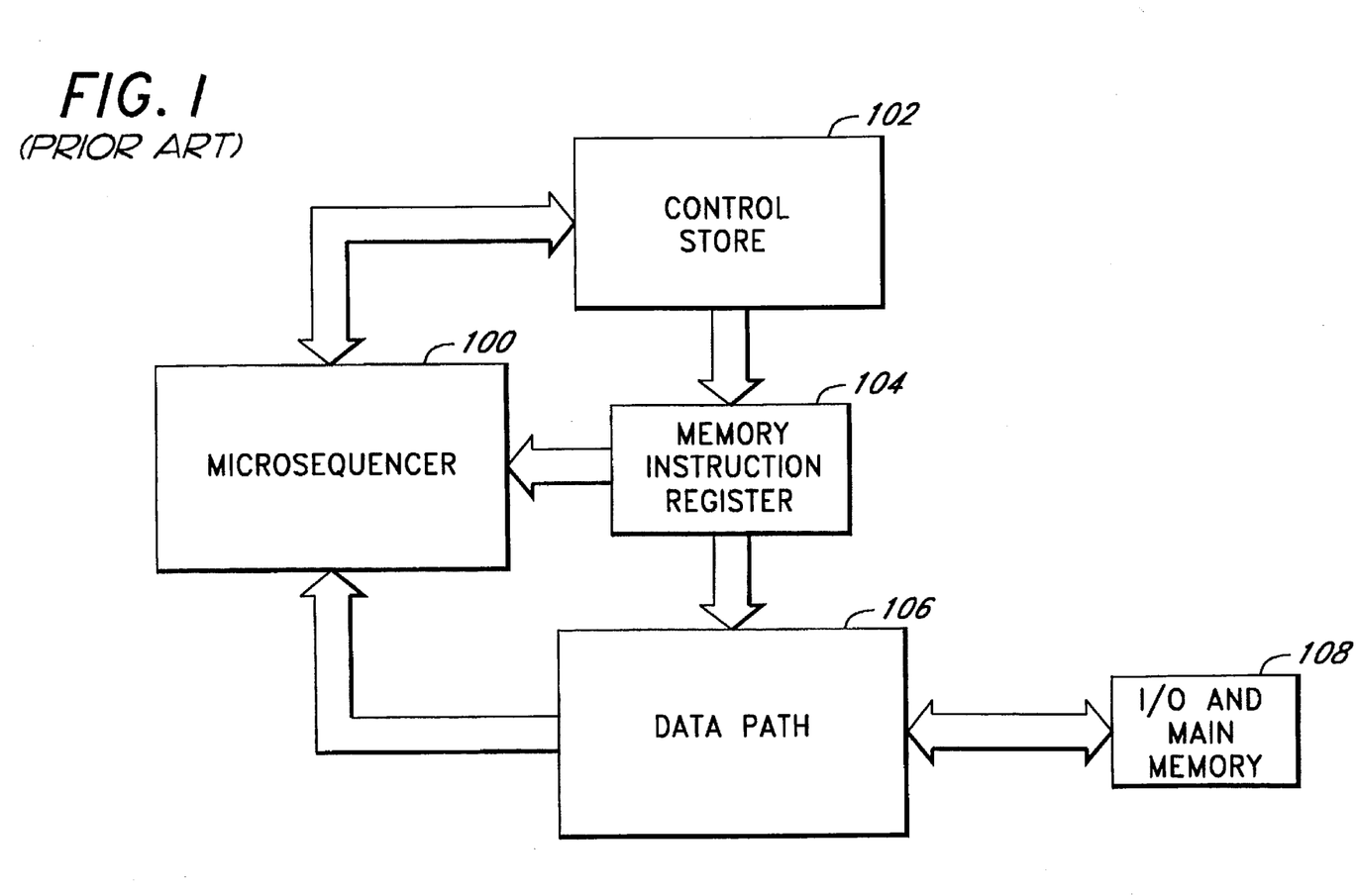
FIG. 1 is a block diagram of one prior art microprogrammable processor system having a control store and an external main memory.

FIG. 1 is a block diagram of an exemplary microprogrammable computer system. The structure of the target machine is a von Neumann machine since program and data share the same main memory address space. However, underlying the von Neumann machine is a microprogram structure. In fact, underlying many microprocessors today is a microprogram structure. For example, the INTEL®80386 and the INTEL®80486 are microprogrammed. In a typical microprogrammable processor, the microsequencer 100 controls execution of a microprogram stored in a control store 102. The microinstruction specified by the microsequencer 100 is fetched from the control store 102 and loaded into the microinstruction register ("MIR"), indicated at 104. The system in FIG. 1, exclusive of control and external memory, consists of the data path 106. The data path 106 refers to the registers, interconnections, and resources of the underlying microprogrammable computer. In a typical microprogrammable processor, the data path resources include an arithmetical and logic unit, counters, and memory interface controls. For every microinstruction fetched from the control store 102 and placed in the microinstruction register 104, a sequence of hardware impulses controls operation of the data path 106. The microsequencer 100 controls microprogram flow either by sequentially accessing microprogram instructions from the control store or receiving microprogram flow information from either the microinstruction register 104 or the data path 106.

As further illustrated in FIG. 1, a two-level machine can be created using this microprogrammable processor system. At the lowest level or host machine level, a programmer who knows about the microprogramming level and has access to the control store could write his own microprogram. In many microprogrammable processors, the control store 102 comprises a read-only memory (ROM) and may not be accessed. However, if the control store 102 comprises a random-access memory (RAM) that a user can read and write, a programmer can store instructions in the control store 102 and directly control execution of the processor system. Although this is seldom encouraged, it is important that the processor has the ability to update its microcode.

The second and most common level of the machine is known as the target machine level. Target machine level instructions are accessed by the data path 106 from the external main memory 108. For each instruction retrieved from external memory 108, a series of microinstructions are executed. In this situation, the host level machine acts as an interpreter (or emulator) for target machine instructions.

One advantage of providing a programmable control store 102 is that a variety of machines can be emulated by the microprogrammable processor system. By reprogramming the host machine control store, different target machine object codes stored in main memory 108 can be retrieved by data path 106 and interpreted by the control store 102.

Early microprogrammable processor systems, as illustrated in FIG. 1, were implemented using ROM due to cost factors. However, recent advances in the speed, density, and price of RAM technology have made it more feasible to use RAM as the control store 102. However, heretofore, these RAMs could only be used as control store, even when the microprogram to be stored in the control store 102 was "shallow" (i.e. the microprogram did not occupy a large portion of the memory). With the availability of larger and lower priced RAMs, shallow microprograms often lead to an enormous waste of memory resources in a microprogram structure.

Figure 2:
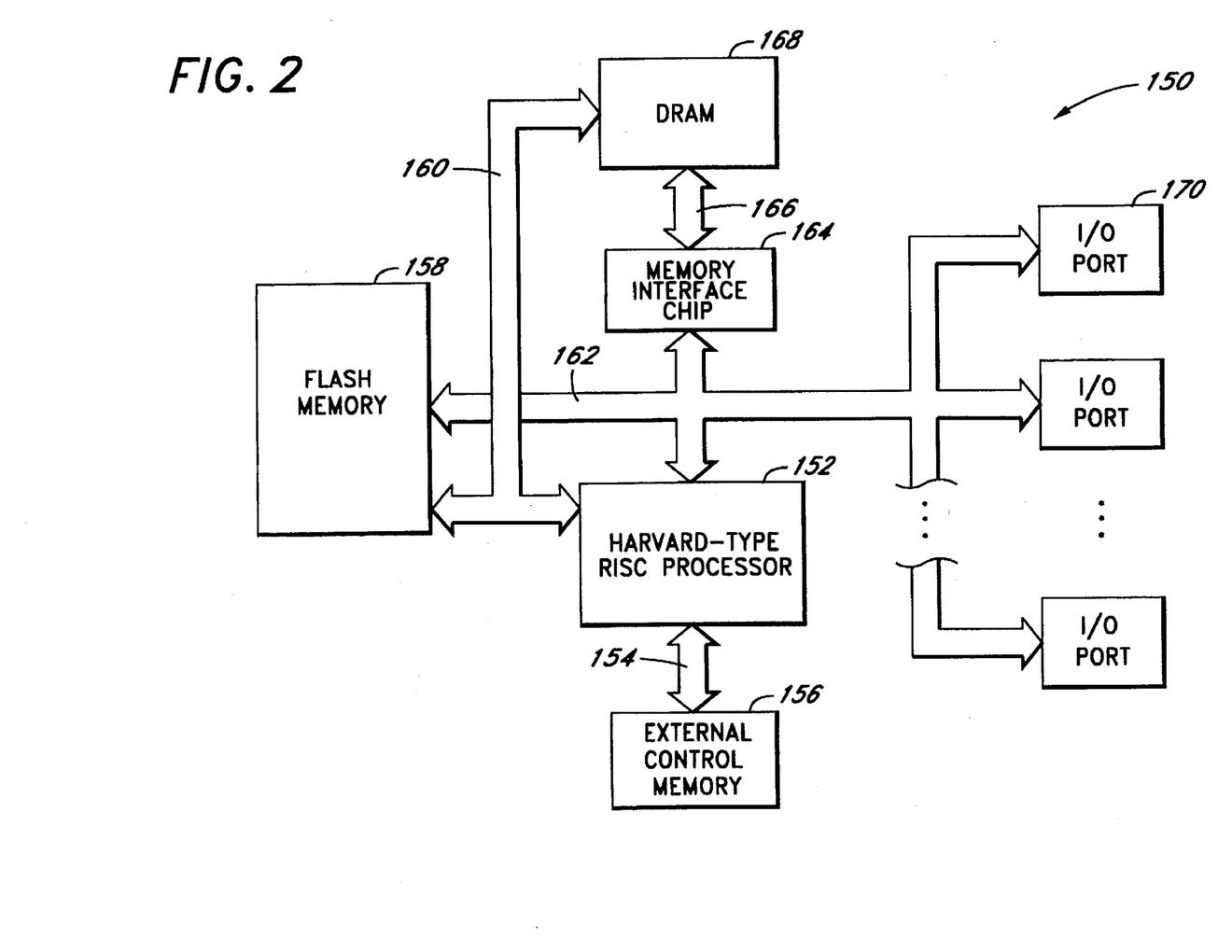
FIG. 2 is a block diagram of an exemplary microprogrammable processor system in accordance with the present invention having the microprogrammable processor connected to an external control memory, a flash memory, and a DRAM.

FIG. 2 illustrates an embodiment of a microprogrammable processor system, indicated generally at 150, that incorporates the present invention which effectively uses space available in external control store as data memory. By effectively sharing the external control store between program and data memory, the performance of a Harvard machine can be attained without requiring external control store resources to be wasted.

The microprogrammable processor system 150 includes a microprogrammable processor 152. At the present time, a suitable microprogrammable processor is the HILEVEL Technologies Harvard-type RISC processor ("HRISC") of the present invention. The HRISC is a 208-pin, 25,000-gate CMOS gate array configured as a microprogrammable processor. As used herein, "internal" refers to circuitry within the HRISC array and "external" refers to circuitry outside the gate array. The HRISC communicates via a communication bus 154 with an external control memory 156. In the present invention, the external control memory 156 is comprised of two 32-bit by 16K high-speed static RAMs ("SRAMs") that are configured as 64-bit wide microinstructions. The internal architecture of the HRISC processor 152 is such that the external control memory 156 may be accessed as storage for microinstructions or as 32-bit wide fast data memory storage.

Since the external control memory 156 comprises a volatile RAM, the HRISC processor 152 must provide a method of loading the initial microprogram into the control memory 156. A low-cost flash memory 158 is electrically coupled to the HRISC processor 152 by an external communication bus 160. In one embodiment of the system, the flash memory comprises 8-bit by 4K EPROM memory. On power-up, the HRISC processor automatically transfers 4K bytes of data from external flash memory 158 to external control memory 156, which forms 512 words of 64-bit wide microinstructions. This function is performed by a boot code ROM stored in the internal control store of the HRISC processor 152. After the boot code has completed transferring 512 microinstruction words, additional microinstructions can be transferred from the external flash memory 158 by the microprogram that the boot loader loaded into external control memory 156.

It should be understood that the use of an 8-bit by 4K EPROM memory and two 32-bit by 16K SRAMs is presented solely as an exemplary embodiment in order to teach the advantages of the system of the present invention. The present invention may use other forms of memory configurations not limited to 8-bit by 128K EPROM memories or two 32-bit by 16K SRAMs. One embodiment of the present invention permits the external control store 156 to be configured for up to 64K of microinstruction words.

The HRISC processor 152 is capable of communicating via an external bus 162 to an external DRAM 168. The HRISC processor 152 communicates via the external bus 162 with a memory control circuit 164 that is advantageously a HILEVEL Technologies Memory Interface Chip ("MEMIC"). However, other commercially available memory interface control circuits can also be used. The memory control circuit 164 provides the memory interface via a communication bus 166 to the external DRAM 168. The HRISC processor 152 may also communicate via the communication bus 162 with a set of I/O ports 170. For example, the HRISC processor 152 can be configured to communicate with an Extended Industry Standard Architecture ("EISA") bus that is commonly found in conventional IBM-compatible Personal Computers.

Figure 3:
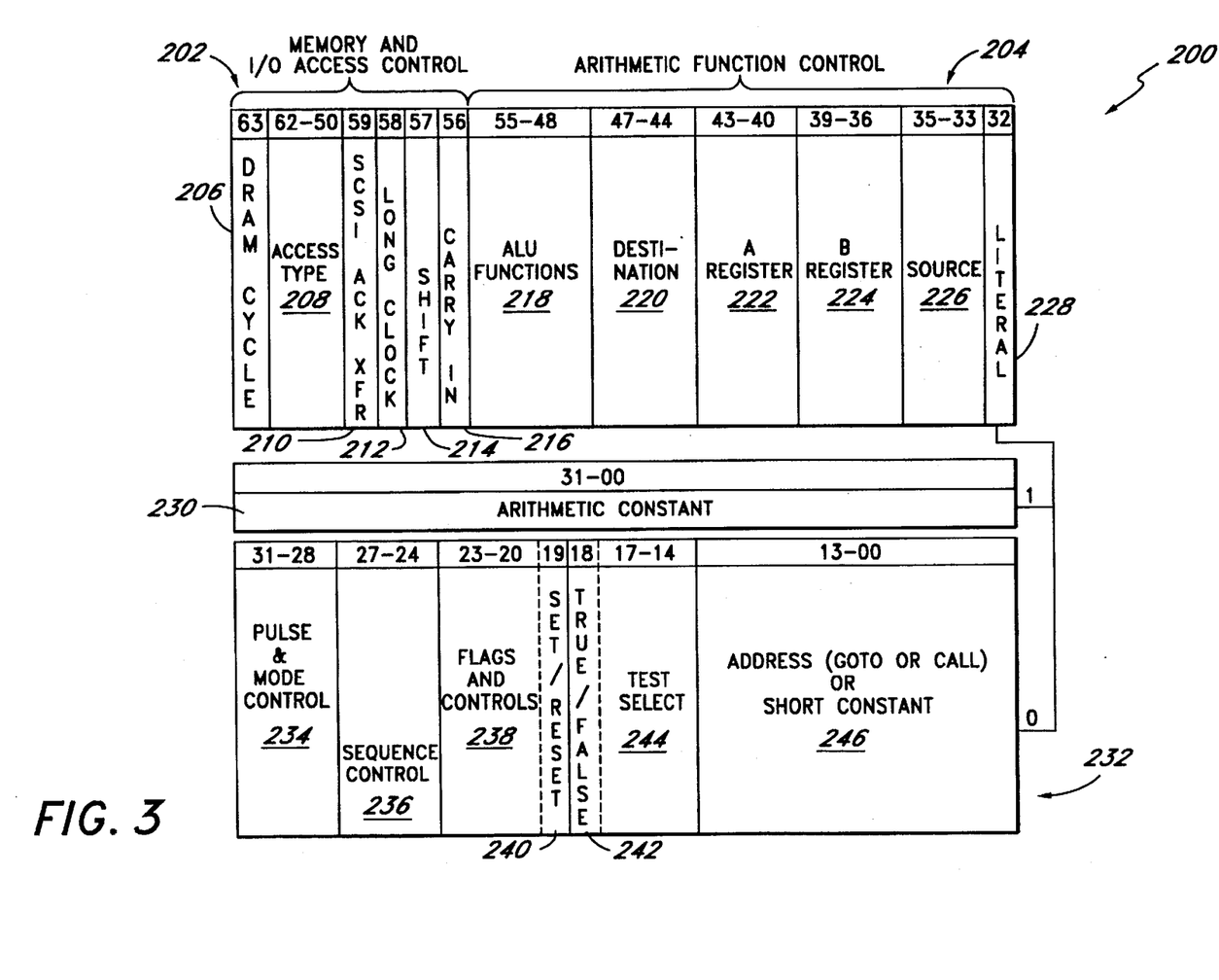
FIG. 3 illustrates a microprogram instruction word and the associated bit fields.

The operation of the HRISC processor 152 is controlled by microinstructions stored in a microprogram control store. FIG. 3 illustrates the configuration of the HRISC microinstruction, indicated generally at 200, and its associated bit fields. Instruction words are 64 bits in length. Microinstructions bits 63-56, indicated generally at 202, provide memory and I/O access control. Bits 55-33, indicated generally at 204, provide arithmetic function control. Bit 32, indicated at 228, is a literal field that controls the function of the bits 31-0. If the literal bit is set to 1, bits 31-0 represent an arithmetic constant as indicated at 230. If bit 32 is set to 0, bits 31-0 operate as indicated generally it 232. Bits 31-28, indicated at 234, provide pulse and mode control. Bits 27-24, indicated at 236, provide sequence control. Bits 23-19, indicated at 238, provide flags and control. Bit 19, indicated at 240, permits flag and control bits 23-20 to be set or reset. Bits 17-14, indicated at 244, control test functions. Bit 18, indicated at 242, selects whether to test for a true or false condition. Bits 13-0, indicated at 246, provide an address for a GOTO or CALL microinstruction, or provide a short arithmetic constant. Each microinstruction 200 maps directly into a series of hardware pulses for controlling the HRISC processor 152. However, each bit field does not necessarily map into control of a single gate in the processor. Bit fields may be encoded to control a plurality of hardware impulses. For example, the bits 43-40, indicated at 222, select one of 16 possible registers for use by the data path 106.

It should be understood that a 64-bit wide microinstruction word is presented solely as an exemplary embodiment in order to teach the advantages of the present invention. The present invention may use longer or shorter microinstruction words. For example, greater functionality may be obtained by using a 128-bit wide microinstruction word. However, wider microinstruction words require more space and, consequently, cost more to implement.

Figure 4:
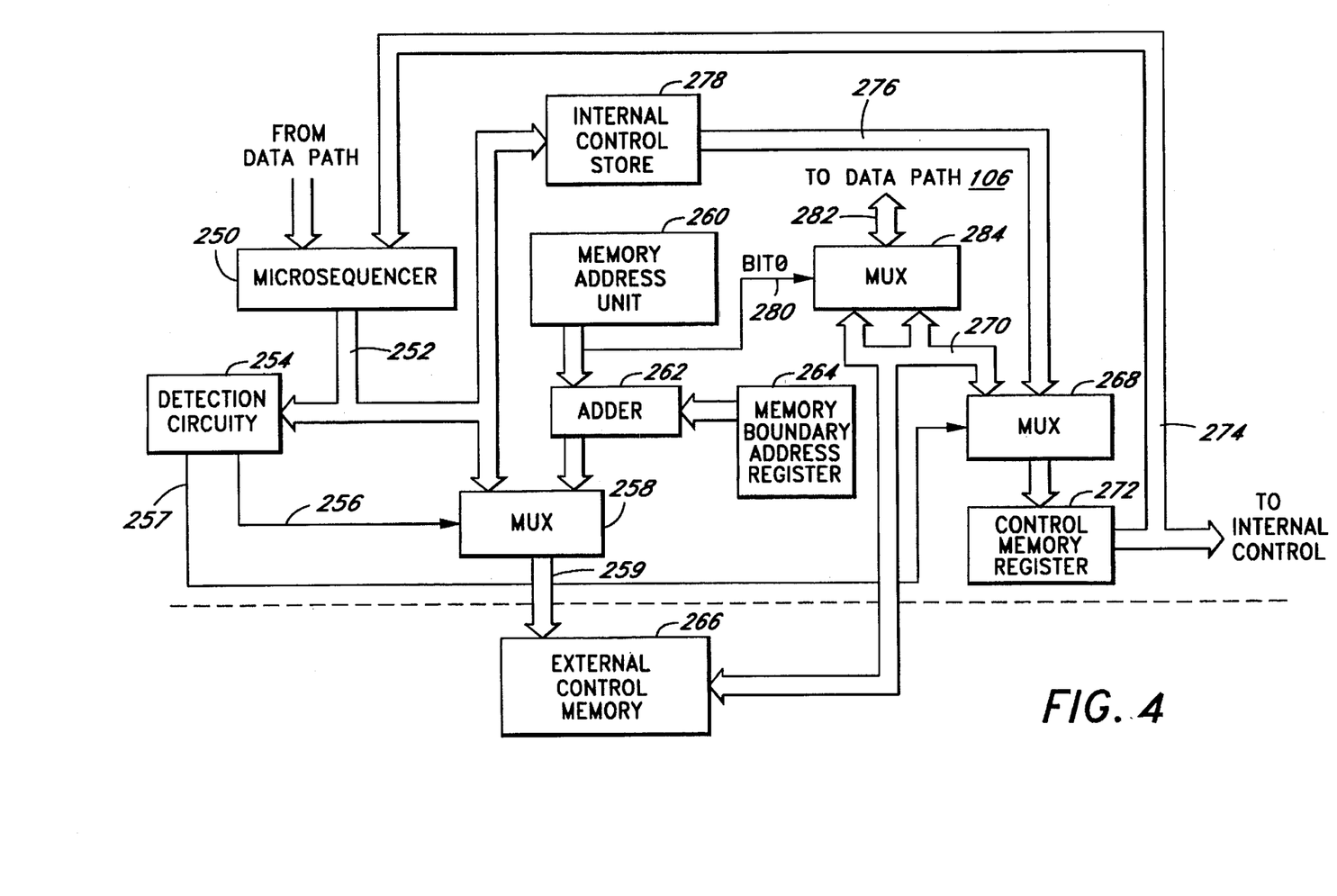
FIG. 4 is a block diagram of the dual internal bus architecture of the present invention that permits access into a microprogram control store while accessing microprogramming instructions.

FIG. 4 illustrates one embodiment of the present invention. The microprogrammable processor of the present invention provides a microsequencer 250 to control program flow. The microsequencer 250 can access microinstructions from either an internal control store 278 or an external control memory 266 via a communication bus 252. The microsequencer 250 determines the sequence of instructions to execute by either sequentially accessing the next instruction in the internal control store 278 or external control memory 266, or from address information provided from either the data path or the present microinstruction being executed, which is stored in the control memory register ("CMR") 272. The current control memory register contents are communicated to the microsequencer via communication bus 274.

The internal control store 278 of the present invention comprises an internal RAM that provides 16 memory locations for storing microinstructions. Typically, only the most time critical loops and functions will be loaded into the internal control store 278. By executing time critical code from the internal control store 278, data may be accessed in parallel from the external control memory 266. It should be understood that the 16 locations in the internal control store 278 are presented solely as an exemplary embodiment in order to teach the advantages of the system of the present invention. The present invention may use larger or smaller internal control stores. For example, a larger control store of 128 internal RAM locations can be used to provide storage for a greater number of microinstructions. However, a larger internal control store requires more space and, consequently, costs more to implement.

In another embodiment of the invention, further processor efficiency is obtained by a clock select circuit. Microinstructions executing from internal control store 278 may operate at a faster clock speed than microinstructions executing from external control memory 266. The HRISC processor 152 provides microinstructions that allow a user to select higher frequency operation of the processor 152 when executing instructions from internal control store 278.

In order to determine whether the microsequencer 250 is accessing a microprogramming instruction in internal control store 278 or in external control memory 266, a detection circuit 254 is provided. If the detection circuit 254 determines that the microsequencer 250 is accessing an instruction in external control memory 266, control signals 256 and 257 are sent to control multiplexers 258 and 268, respectfully. The multiplexer 258 configures the communications buses to allow the microsequencer 250 to access microinstructions stored in the external control memory 266. The multiplexer 268 is selected to configure the communication bus 270 to permit the external control memory 266 to write to the control memory register 272. Microinstructions stored in the control memory register 272 operate the internal control of the HRISC processor 152.

If the detection circuit 254 detects a microsequencer access to the internal control store 278, a control signal 257 is sent to the multiplexer 268. Upon receiving the control signal 257, the multiplexer 268 selects the internal control store 278 to write to the control memory register 272 via the communication bus 276.

If the detection circuit 254 detects a microsequencer access to the internal control store 278 and a data memory access to memory address unit 260, a control signal 256 is sent to multiplexer 258. The multiplexer 258 receives the control signal 256 and configures the communication buses to provide the memory address unit 260 access to the external control memory 266 as fast data memory. The memory address unit 260 may only generate addresses to the external control memory 266 when the HRISC processor 152 is accessing microsequencer instructions from the internal control store 278.

Hence, address and data for the internal control store 278 and external control memory 266 are physically separate. In this arrangement, no intrinsic conflict exists that can cause collision with program and data retrievals. As with the pure Harvard architecture, the present invention has the performance advantage due to the ability to simultaneously access instructions and data. Furthermore, as with the von Neumann architecture, the processor has the economic benefit of sharing data and instructions in the same memory.

In the present invention, the memory address unit 260 is configured to access external control memory 266 as fast data memory starting at logical data address 0. However, the external control memory 266 is configured to store microprogram instructions starting at physical address 0. Therefore, in order to map the logical data address generated by the memory address unit 260 to the physical data address in the external control memory 266, an adder 262 is provided. The adder 262 adds the logical data address provided by the memory address unit 260 to a value stored in a user programmable memory boundary address register ("MBAR") 264 coupled to the adder 262. The output of the adder 262 generates the physical address of data stored in the external control memory 266. The memory boundary address register 264 is a 4-bit control register. The value stored in the memory boundary address register 264 is multiplied by 2K (i.e. 2,048) to indicate the amount of memory in the external control memory 266 to be configured for storing microprogram microinstructions. In this manner, up to 32K of memory locations may be configured for storage of microinstructions. Remaining memory space in the external control memory 266 may be accessed as data memory.

In the present invention, the external control memory 266 is 64 bits wide. However, the internal data path of the processor is 32 bits. When the memory address unit 260 generates an address to the external control memory 266 to read the memory as data memory, 64 bits are placed on the communication bus 270. The multiplexer 284 selects either the upper 32 bits or the lower 32 bits of the 64-bit word to transfer to the data path 106 (FIG. 1) via communication bus 282. In order to perform this operation, bit 0 of the address generated by the memory address unit 260 controls operation of the multiplexer 284. In the present invention, the memory address unit 260 generates a 20-bit address (referred to as bits 19-0, in which bit 19 is the upper most address bit). Bits 19-1 are effectively shifted right by one bit and are added to the value in the memory boundary address register 264 to generate the physical data address in the external control memory 266. Therefore, the only function of bit 0 during a data access to the external control memory 266 is to differentiate between the most significant word (bits 63-32) and the least significant word (bits 31-0) of the 64-bit data. By using bit 0 to select the upper 32 bits of the data, two data words are stored in the external control memory 266 for each physical data address. In order to write to the external control memory 266, the data path 106 provides the 32-bit data word over the communication bus 282 to the multiplexer 284. Since the communication bus 270 comprises 64 bits, the 32-bit data word is provided as the upper and lower 32 bits of the 64-bit word on the communication bus 270. When writing to the external control memory 266, address bits 19-1 of the address generated by the memory address unit 260 are used to select the appropriate address in which to write the data word. Bit 0 is used to generate a select signal to select which bank of the external control memory 266 is accessed. In the present invention, the external control memory 266 is comprised of two 32-bit by 16K SRAMs configured to form a 64-bit wide memory. The configuration of data addresses in external control memory 266 is further illustrated by FIG. 7.

Although not specifically shown in FIG. 1 and 4, the data path 106 of the present invention advantageously comprises a 32-bit register file and arithmetic and logic unit based on the AMD 2901 architecture. A 32-bit barrel shifter and a 64-bit hardware multiplier are also included. In addition, three hardware counters are included for addressing.

The dual bus architecture of the present invention has powerful ramifications. By providing separate busses to access the external control memory 266 as data memory and a bus to access the internal control store 278 and the external control memory 266 as microinstruction memory, simultaneous accesses to the external control memory 266 and the internal control store 278 are available. When the external control store 266 is accessed as data memory, no collision exists with microinstructions accessed from the internal control store 278. Address and data for the internal control store 278 and the external control memory 266 are physically separate. Therefore, no conflict exists when accessing program from the internal control store 278 in parallel with data from the external control memory 266. The present invention has provided the performance edge of a Harvard architecture by giving the ability to simultaneously access instructions and data, as well as the economic benefit of sharing external memory as data and instructions of a von Neumann machine.

Further aspects of the dual internal bus architecture of the present invention that permits access into a microprogram control store while accessing microprogramming instructions in accordance with the present invention may be better understood in connection with a flow chart representation of the steps necessary to perform these functions.

Figure 5:
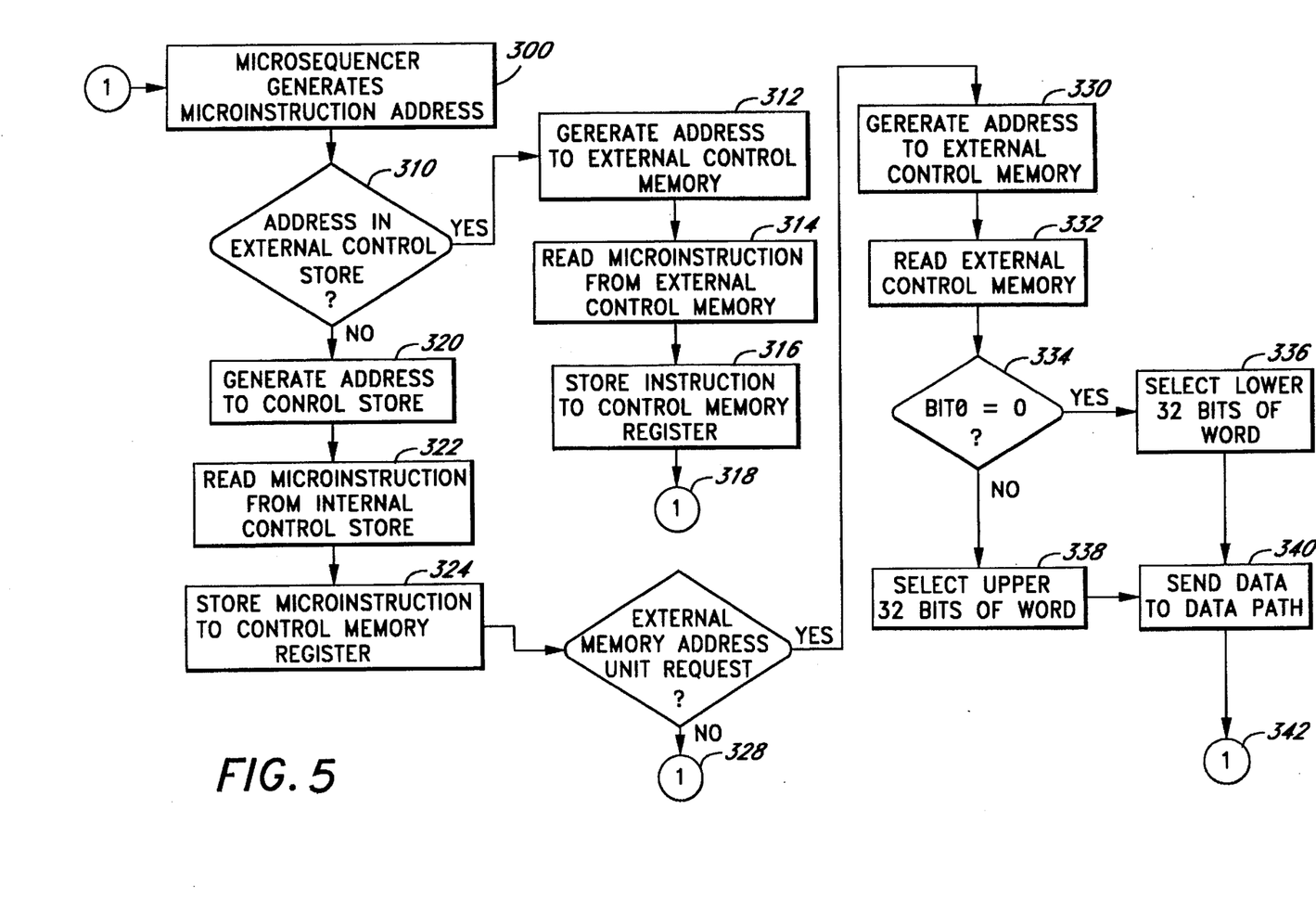
FIG. 5 illustrates a logic diagram for the operation of the dual internal bus architecture of the present invention.

FIG. 5 is a flow chart representation of the decision-making process carried out by the microprogrammable processor when addressing control store. It should be further understood that this flow chart representation does not represent the sequential steps the processor performs (i.e., step 310 does not necessarily follow step 300). Rather, all steps are performed in parallel.

The decision-making process begins in step 300 when microsequencer 150 generates a microinstruction address in order to access a microinstruction from the selected control store. If the address is located in the external control memory 266 in step 510, the multiplexer 258 generates an external address to the external control memory 266 in step 312. In step 314, the microinstruction is read into the control memory register 272 via communication bus 270 through the multiplexer 268, which has been configured to load the control memory register 272 with the microinstruction from external control memory 266. After storing the microinstruction in the control memory register 272 in step 316, program flow returns to step 300 for the next microsequencer generated microinstruction address in step 318. Instructions stored in the control memory register 272 operate the internal control of the processor.

If the address in step 310 is not in the external control memory 266, the microinstruction address is generated to the internal control store 278 in step 320. The microinstruction is read from the internal control store 278 in step 322. The multiplexer 268 selects the internal control store 278 to load microinstructions to the control memory register 272 in step 324. During instruction access, the memory address unit 260 in step 326 determines if an external data address is being generated by the processor. If not, execution continues in step 300 with the next microsequencer address. However, if the microsequencer 250 is accessing the internal control store 266 and the memory address unit 260 attempts a data access to the external control memory 266, the multiplexer 258 is configured to generate an address to the external control memory 266 in step 330. The memory address unit 260 generates a logical data address. An adder 262 is provided to generate a physical data address to the external control store 266. The data is read from the external control memory 266 and is passed via a communication bus 270 to a multiplexer 284. In step 334, the last bit of the address generated by the memory address unit 260 is tested. If the bit is 0, the multiplexer 284 selects the lower 32 bits of the 64-bit data word read from external control memory 266. Those 32 bits are sent via the communication bus 282 to the data path 106. If bit 0 is not equal to 0, then the upper 32 bits of the data read from the external control memory 266 are sent to the data path 106 via the communication bus 284 in step 340. Upon reading the data, program flow continues with the next microsequencer address in step 300.

Figure 6:
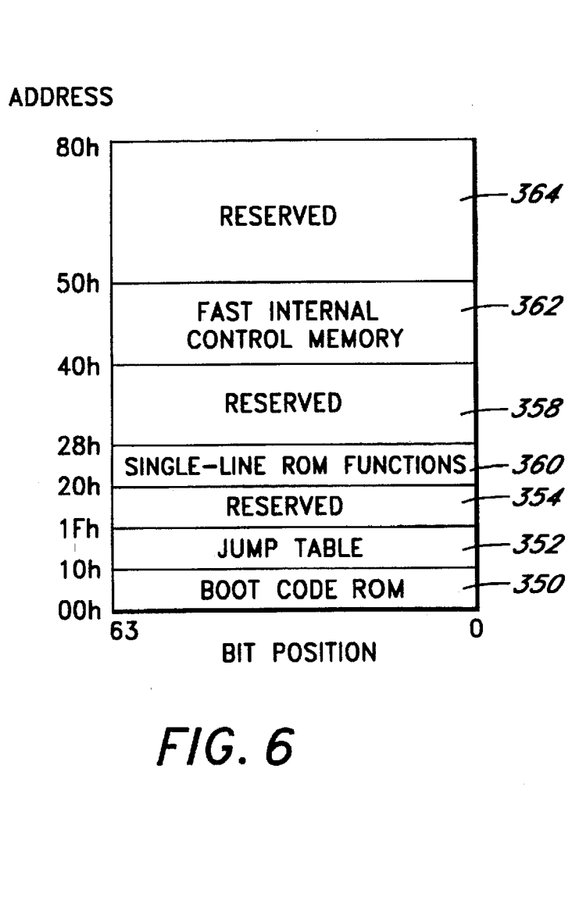
FIG. 6 illustrates the internal control memory configuration, including the addresses of the boot code ROM and the fast internal control store.
Figure 7:
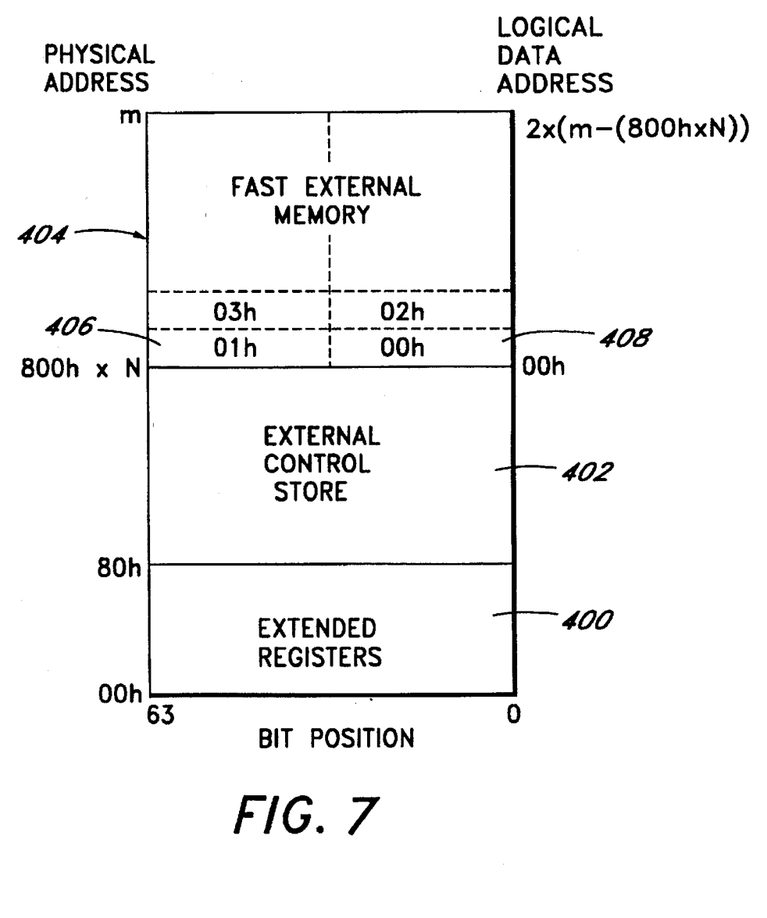
FIG. 7 illustrates the external control memory configuration and the physical addresses and logical data addresses of the external control store and fast external memory.

FIGS. 6 and 7 provide memory maps of the configuration of external and internal control memory in the present invention. FIG. 6 illustrates the internal control memory configuration. A boot code ROM 350 is located in the microinstruction address range 0H-0FH. The boot code ROM 350 loads microinstructions stored in the external flash memory 158 to the external control memory 266 upon resetting the microprogrammable processor. The jump table 352, located at addresses 10H-1EH, comprises a series of GOTO instructions to entry points in memory 266. The jump table 352 provides a memory trapping capability. For example, in one embodiment of the present invention as illustrated in FIG. 2, the memory trap capability detects an external memory access by the HRISC processor 152 to an address beyond the boundary of the external control memory 156. Upon detecting an access beyond the boundary of the external control memory 156, the HRISC processor 152 determines the address to "jump" to in a different bank of memory by looking up the address in the jump table 352. As illustrated in FIG. 2, when the HRISC processor 152 attempts to access an address beyond the address in external control memory, the jump table is configured to jump to an address in external DRAM 168.

Memory locations 1FH and 28H-40H (indicated at 354 and 358, respectively) are reserved for use by the HRISC processor 152. Single-line ROM functions 360 are located in 20H-28; H and provide a single line microinstruction with a RETURN. The fast internal control store 362, which provides the ability to execute microinstructions from internal control store 278 while accessing data from the external control store 266, is located in locations 40H-4FH. Locations 50H-7FH, indicated at 364, are also reserved for the HRISC processor 152. It should be understood that the size and location of the various portions of internal control memory are an exemplary embodiment in order to teach advantages of the present invention. The present invention may use other configurations of the internal control memory. For example, a larger internal control store 278 can be configured to allow more microinstructions to be stored into the internal control store 278, thereby providing the processor a greater ability to access the external control memory 266 as data memory.

FIG. 7 illustrates the external control memory configuration. The present invention provides that part of the external control memory 266 can be configured for microinstructions, while the other part can be configured for fast external memory 404. Locations 00H–7FH are reserved for extended registers 400. The size of the external control store 402 is controlled by the memory boundary address register 264 ("MBAR"). The external control store 402 may be configured in 2K (800H) blocks. By loading a value into the memory boundary address register 264, the size of the external control store 402 is configured. For example, if the memory boundary address register 264 is loaded with the value two, a 4K block of the external control memory 266 is configured as external control store 402. All available memory greater than 4K (1000H), is configured as fast external memory 404. Logically, the fast external memory 404 is addressed from location 00H. However, the fast external memory address is physically located at 1000H in external control memory 266. In one embodiment of the present invention, the external control memory 266 is 64-bits wide. External control store microinstructions are configured as 64 bits. External data, however, is configured as 32 bits. In order to properly address the external control memory 266 as fast external memory 404, bits 19-1 of the address generated by the memory address unit is shifted right one bit, added to the value in the memory boundary address register 264, and provided to the external control memory 266. Bit 0 is supplied to the multiplexer 254 to select which half of the 64-bit data word read from external control memory 266 should be provided to the data path 106. For example, in order to access logical data memory address 01H located at physical address 800H (assuming N=1), the memory address unit generates an address of 0 (because the bit 0 position is ignored), and the value 800H is added to the address generated by the memory address unit. The entire 64-bit data word is read from location 800H. All 64 bits are provided to the multiplexer 254, and bit 0 selects which half of the external data word to send to the data path 106. In the present example, bit 0 is a "1," which selects the upper 32 bits of the external data word at physical address 800h to be sent to the data path 106.

For any writes to the fast external memory 404, the same problem exists. The data path 106 supplies a 32-bit data word to be written into the 64-bit external memory. As with a read, bits 19-1 of the address generated by the memory address unit 260 are added to the memory boundary address register 264 to generate the physical address in the external control memory 266. Additional control lines are provided to select which 32-bit bank of the external control memory 266 to activate for a 32-bit write. While both banks of external SRAM are normally activated on an access to the external control memory 266 only one bank of memory will be enabled based upon the value of bit 0 of the address generated by the memory address unit 260 on a write to fast external memory 404.

In operation, this invention allows a microprogrammable processor to access an external control memory 266 as either program or data memory. In this manner, the dual bus architecture of the present invention provides the advantages of a Harvard-type machine, but only requires one external RAM, as in a von Neumann machine.

Although the present invention has been described in detail, it should be understood that various changes, substitutions, and alterations can be made hereto without departing from the spirit and scope of the invention as defined by the appended claims.

What is claimed is:

1. A microprogrammable processor capable of accessing unused portions of an external, single-port control store as fast data memory, said microprogrammable processor comprising:

an internal control store which stores microinstructions that control operation of the microprogrammable processor, said internal control store having substantially less storage capacity than said external control store; and a microsequencer operable to control program flow and to access microinstructions from either said internal control store or the external control store, said microsequencer further operable to access said internal control store to obtain microinstructions at the same time as the microprogrammable processor accesses said external control store as fast data memory to obtain data.

2. The microprogrammable processor as defined in claim 1, further comprising:

a first internal communication bus that provides said microsequencer electrical communication to said internal control store; and a second internal communication bus that provides said microsequencer communication to said external control store, said second internal communication bus further operable to allow the microprogrammable processor to access said external control store as fast data memory.

3. The microprogrammable processor as defined in claim 2, further comprising:

a multiplexer in electrical communication with said second internal communication bus, said multiplexer configured to select operation of said second internal communication bus; and a detection circuit operable to control operation of said multiplexer, said detection circuit operable to detect an access by said microsequencer to said internal control store, said detection circuit further operable to configure said multiplexer to allow said second internal communications bus to provide said microprogrammable processor access to said external control store as fast data memory.

4. The microprogrammable processor as defined in claim 1, further comprising:

a memory address unit operable to access data from the external control store when said microsequencer accesses microinstructions from said internal control store;

a memory boundary address register programmable to configure portions of the external control store as fast data memory; and an adder coupled to said memory address unit for generating a physical data address in said external control store from a logical data address provided in said microinstruction, said adder operable to add the contents of said memory boundary address register to said logical data address when said detection circuit detects an access by said memory address unit to microinstructions stored in said internal control store.

5. The microprogrammable processor as defined in claim 1, further comprising a boot loader operable to load microinstructions from external non-volatile storage memory to control store.

6. A method for managing a control store of a microprogrammable processor, comprising the steps of:

providing an internal control store for microinstructions that control operation of the microprogrammable processor;

providing an external, single-port control store for microinstructions that control operation of the microprogrammable processor;

configuring portions of the external control store as data memory; and generating data accesses to said external control store at the same time as the microprogrammable processor accesses microinstructions from the internal control store.

7. The method for managing a control store of a microprogrammable processor as defined in claim 6, further comprising the step of detecting an access to internal control store with a detection circuit.

8. The method for managing control store of a microprogrammable processor as defined in claim 6, further comprising the step of generating a physical data address in said external control store from a logical data address provided in said microinstruction by adding the value stored in a programmable memory boundary address register.

* * * * *